United States Patent [19]

Jensen

[11] 4,140,625
[45] Feb. 20, 1979

[54] MIXED-PHASE DISTRIBUTOR FOR FIXED-BED CATALYTIC REACTION CHAMBERS

[75] Inventor: Robert H. Jensen, Clarendon Hills, Ill.

[73] Assignee: UOP Inc., Des Plaines, Ill.

[21] Appl. No.: 862,070

[22] Filed: Dec. 19, 1977

[51] Int. Cl.² .................... B01J 8/02; C10G 11/10
[52] U.S. Cl. .................... 208/146; 261/96; 261/118; 261/DIG. 26; 366/340; 422/220; 422/224
[58] Field of Search ........ 23/288 R, 283 (U.S. Only); 208/146; 261/94, 96, 97, 118, 78 A, DIG. 26; 366/340

[56] References Cited

U.S. PATENT DOCUMENTS

| 2,385,200 | 9/1945 | Friedel | 23/283 X |
|---|---|---|---|
| 2,399,560 | 4/1946 | Murphree | 23/288 R |
| 2,523,126 | 9/1950 | Long | 261/78 A |
| 3,431,084 | 3/1969 | Forbes | 23/288 R |
| 3,541,000 | 11/1970 | Hanson et al. | 23/288 R X |
| 3,705,016 | 12/1972 | Ludwigsen et al. | 23/288 R X |
| 3,824,081 | 7/1974 | Smith et al. | 23/288 R |
| 3,884,643 | 5/1975 | Ballestra et al. | 23/283 X |

Primary Examiner—Joseph Scovronek
Attorney, Agent, or Firm—James R. Hoatson, Jr.; Robert W. Erickson; William H. Page, II

[57] ABSTRACT

Distribution of a mixed-phase, vapor/liquid reactant stream to a fixed-bed of catalyst particles is accomplished through the use of a distributor tray in the form of a horizontal plate (or deck) having a plurality of vertically-disposed venturi-shaped eductors. The distributing device is installed within a substantially catalyst-free area of the reaction chamber and serves (i) to initially distribute the reactant stream as a froth to the reaction chamber and/or, (2) to distribute the effluent from one bed of catalyst particles to the next succeeding bed of catalyst particles.

14 Claims, 21 Drawing Figures

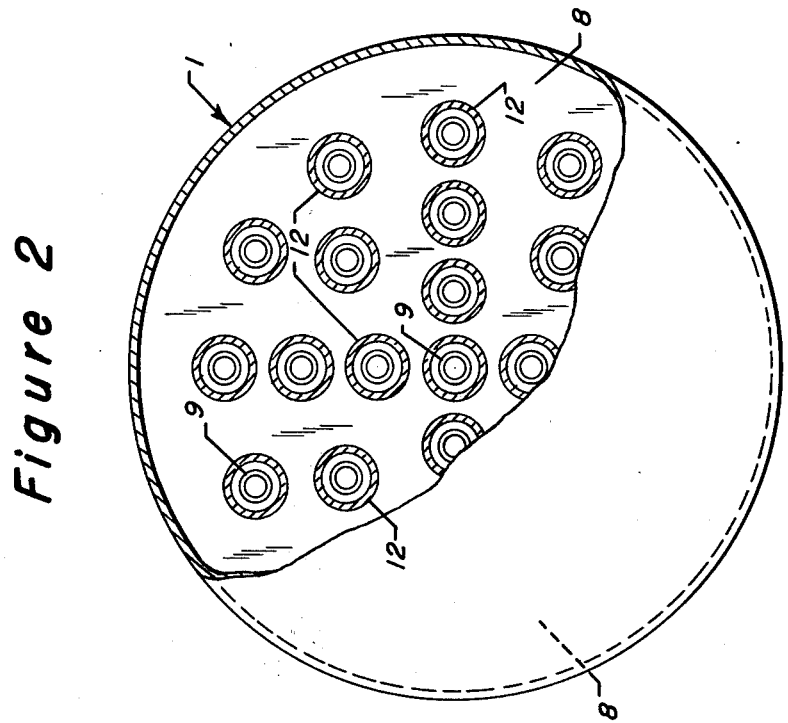
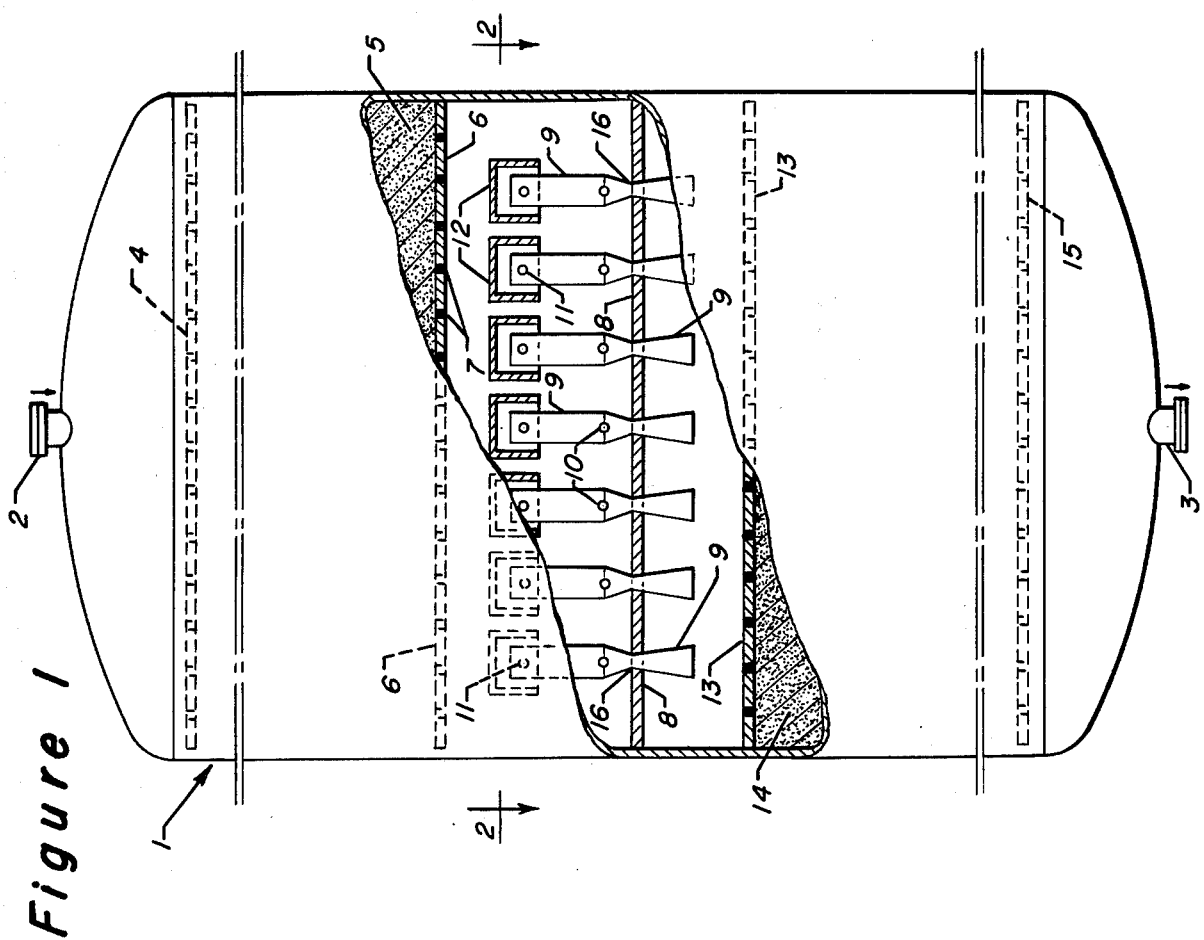

Figure 5
Figure 6
Figure 7
Figure 8
Figure 9
Figure 10
Figure 11
Figure 12
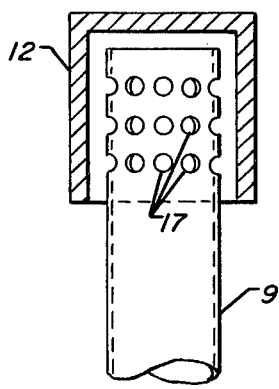
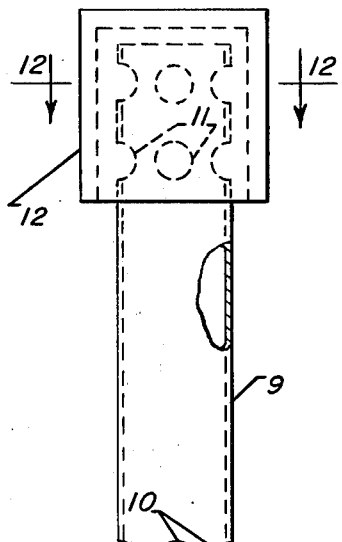
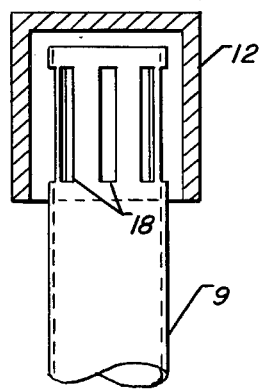
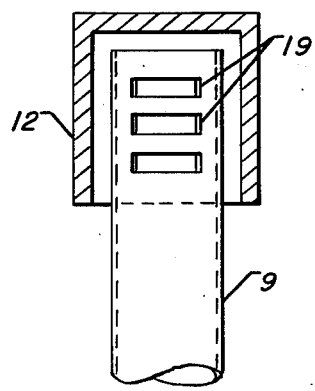
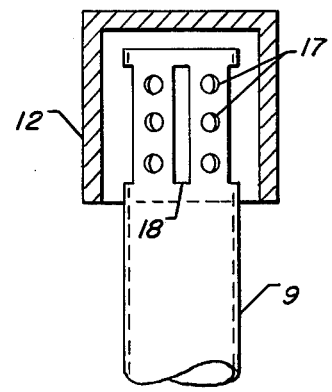
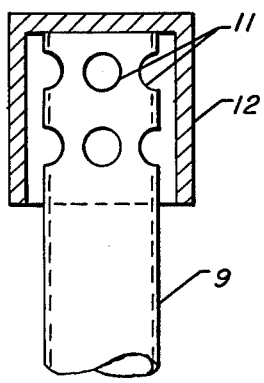
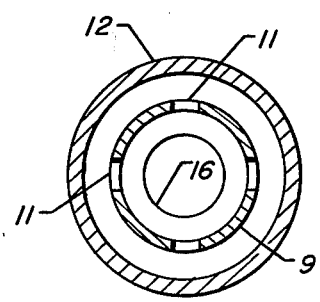
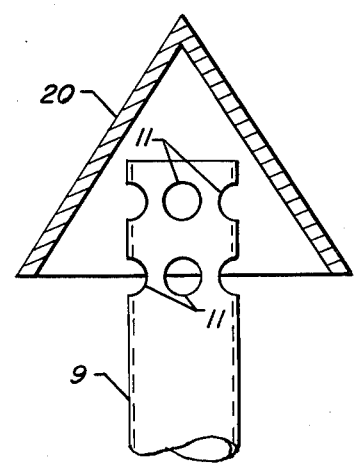

MIXED-PHASE DISTRIBUTOR FOR FIXED-BED CATALYTIC REACTION CHAMBERS

APPLICABILITY OF INVENTION

The method for effecting uniform distribution of a mixed-phase reactant stream to a fixed-bed of catalyst particles and the distributor apparatus therefor, encompassed by my inventive concept, are intended to be applied to processes widely practiced within the petrochemical and petroleum industries. Furthermore, the present invention is specifically directed toward the distribution of a mixed vapor/liquid phase to a fixed-bed of catalyst particles disposed within a catalytic reaction chamber. As such, it is well-suited for use (1) to distribute the reactant stream as it initially enters the reactant chamber and, (2) to distribute the mixed-phase effluent from one distinct bed of catalyst particles into the next succeeding lower bed of catalyst particles. Essentially, it is intended to utilize the present technique and apparatus in those catalytic reaction systems in which the vapor/liquid reactant stream flows cocurrently and downwardly.

Although mixed-phase reactions are found in both petroleum refining and petrochemical processes, they appear to be more prevalent in the former; therefore, the following discussion will be limited to catalyzed hydrocarbon conversion reactions without, however, the intent to unduly restrict the broad scope of the invention herein described. Mixed-phase hydrocarbon conversion reactions are generally effected in those processes where the fresh feed charge stock predominates in hydrocarbons boiling above the naphtha boiling range — i.e. above a temperature of about 400° F. In many cases, the vapor/liquid reactant stream consists of liquid hydrocarbon constituents and a vapor phase which is concentrated in hydrogen. Charge stocks include kerosene fractions, light and heavy gas oils (both atmospheric and vacuum) and asphaltenic black oils containing hydrocarbonaceous material boiling above about 1050° F. Obviously, my invention does not rely for viability upon a particular hydrocarbonaceous charge stock, nor upon the particular reaction, or reactions being effected. The latter include hydrocracking, hydrogenation, desulfurization, denitrogenation, hydrotreating and combinations thereof, all of which are hydrogen-consuming and, therefore, principally exothermic in nature.

Paramount to successfully effecting hydrogen-consuming reactions in mixed-phase processing is the uniform distribution of the reactant stream to the fixed-bed of catalyst particles. Where a given reaction chamber contains more than one distinct bed of catalyst particles, uniform distribution of the reactant stream from a preceding bed to a succeeding bed must also be effected. Tantamount to hydrogen-consuming reactions is the continuous intimate contact of hydrogen with the hydrocarbonaceous reactants, not only at the initial portion of the catalyst bed, but also throughout the same as the reactant stream flows downwardly therethrough. The tendency for liquid and vapor constituents to segregate and seek separate paths while traversing the bed of catalyst particles is commonly known and referred to as "channelling." As hereinafter indicated, the detrimental effects of channelling are well known and a multiplicity of devices have been provided in order to alleviate the same.

The technique and apparatus herein described is also directed toward uniform distribution of a mixed-phase reactant stream to a fixed-bed of catalyst particles; however, provision is made to provide for continued intimate vapor/liquid contact as the reactant stream traverses the catalyst bed. Briefly, the technique involves distinct operations, all of which are effected by and within the apparatus. The distributing device is installed within a substantially catalyst-free area wherein the mixed-phase reactant stream, whether initially introduced into the reaction chamber, or emanating as product effluent from one catalyst bed into the next succeeding catalyst bed, is separated into a substantially liquid-free vapor phase and a substantially vapor-free liquid phase. In essence, the device is constructed of a plurality of venturi-shaped eductors which are vertically-disposed upon a horizontal plate, or baffle, which is otherwise substantially imperforate. Vapor-phase components enter the upper end of the eductor through apertures therein; similarly, liquid-phase components are introduced by way of apertures disposed proximate to the venturi-throat of the eductor. Preferably, although not necessarily, the venturi throats are proximate to the plane containing the horizontal plate. The lower, liquid inlet apertures are sealed by maintaining a level of liquid-phase components on the horizontal tray. Downflowing vapors achieve a gas velocity of from 60 to about 400 feet/second, or more, thus creating a high degree of liquid dispersion as the liquid-phase components are educted into the venturi-tube proximate to the throat. This relatively stable, intimate dispersion of liquid in a continuous vapor phase is often referred to as "froth," or "aerosol mist." As such, it gradually rather than immediately, collapses as the distributed froth traverses the subsequent bed of catalyst particles.

OBJECTS AND EMBODIMENTS

A principal object of my invention is to provide uniform distribution of a mixed-phase vapor/liquid reactant stream to a fixed-bed of catalyst particles. A corollary objective is to afford a technique which produces a decrease in the vapor/liquid "channelling" effect as the reactant stream traverses the bed of catalyst particles.

A specific object of the invention as herein described is to provide a vapor/liquid distributor device which can initially distribute the reactant feed stream to the uppermost catalyst bed, or function intermediate two catalyst beds to distribute the mixed-phase effluent from an upper catalyst bed uniformly to the next succeeding lower catalyst bed.

Still another object is directed toward uniform introduction of a vapor/liquid mixed-phase, to a bed of catalyst particles, in froth, or aerosol mist form which possesses the capability of resisting segregation and subsequent channelling as it traverses the catalyst bed.

Therefore, in one embodiment, my invention is directed toward a cocurrent, mixed-phase catalytic reaction system wherein a vapor/liquid reactant stream flows downwardly through a fixed-bed of catalyst particles, and encompasses the method, for effecting the uniform distribution of said reactant stream, which comprises the sequential steps of: (a) introducing said reactant stream into a substantially catalyst-free area (i) within said reaction system and, (ii) containing a plurality of vertically-disposed, venturi-shaped eductors; (b) passing vaporous reactant stream components (i) through an aperture in the upper portion of each eductor and, (ii) downwardly through the venturi throat thereof; (c) educting liquid reactant stream components through a liquid-sealed aperture in the lower portion of each eductor proximate to the venturi throat thereof; and, (d) discharging the resulting mixed vapor/liquid reactant stream from the lower end of each venturi-shaped eductor onto a bed of catalyst particles disposed below said catalyst-free area.

This embodiment is further characterized in that the mixed-phase reactant stream is passed into said first catalyst-free area when it is initially introduced into the catalytic reaction system. Further, it may be passed into the first catalyst-free area as the effluent from an upper, preceding fixed-bed of catalyst particles.

In another embodiment, my invention involves a vapor/liquid distributor for effecting uniform distribution of a mixed-phase reactant stream to the upper surface of a fixed-bed of catalyst particles disposed within a catalytic reaction chamber, which distributor comprises, in cooperative relationship: (a) a horizontal plate attached to the entire inner surface of said reaction chamber; (b) a plurality of vertically-disposed, venturi-shaped eductors extending above and below said horizontal plate; (c) at least one vapor inlet aperture in the upper section of each of said eductors; and, (d) at least one liquid inlet aperture in the lower section of each of said eductors disposed (i) above said horizontal plate and, (ii) proximate to the venturi throat thereof.

This embodiment may be additionally characterized in that an imperforate plate, or baffle covers the open upper end of the venturi-shaped eductor to prevent liquid-phase components from entering therein. Other objects and embodiments of the present invention, not otherwise specifically delineated herein, will become evident from the following more completely detailed description thereof.

CITATION OF RELEVANT PRIOR ART

It must be recognized and acknowledged that the prior art abounds with a wide variety of devices to introduce (1) a mixed-phase reactant stream into a catalytic reaction zone, (2) a vapor and/or liquid quench stream at an intermediate locus within a fixed-bed of catalyst particles and, (3) the mixed-phase effluent from an upper catalyst bed into the next succeeding lower catalyst bed. A perusal of the appropriate Classes 23-288 and 208-146 indicates that this is the case.

For example, U.S. Pat. No. 2,981,677 (Cl. 208-146), issued Apr. 25, 1961, is illustrative of a tri-conversion zone reaction chamber for utilization in a countercurrently-conducted catalytic process; liquid flows serially in a downwardly direction while the vaporous reactant flows upwardly. In essence, the apparatus consists of a horizontal plate containing a plurality of vapor risers, in the form of bubble caps, through which liquid reactant flows downwardly; the plate supports the catalyst bed into which the risers extend. A second horizontal plate is disposed a finite distance above the catalyst bed, and contains a plurality of liquid downcomers through which liquid flows downwardly into the lower catalyst bed. The void volume between the catalyst bed and the second horizontal plate is referred to as a disengaging space; however, not all the vaporous material is separated therein. That is, a quantity thereof flows upwardly through the liquid downcomers in the horizontal plate. Details of this operation, shown graphically in FIG. 1 as conversion zone, "A," are given in Column 3, Lines 31-47 (downwardly-flowing liquid) and in Column 4, Line 60 through Column 5, Line 17 (upwardly-flowing vaporous constituents). The apparatus further makes provision for a liquid quench (conduits 48, 50 and 52 in FIG. 1) as described in Column 5, Lines 45-56. Initially, it must be noted that the apparatus is peculiar to countercurrent flow of gaseous and liquid constituents. This, however, is not the most distinguishing feature with respect to the vapor/liquid mixed-phase distributor claimed and described herein. Most noteworthy is the fact that the apparatus of the reference makes no provision for a re-mixing of the separated liquid and vapor streams to create a froth for re-distribution to the next succeeding catalyst bed. Indeed, not only is it incapable of creating such a froth, to do so would effectively destroy its intended function. Further, the apparatus does not effect virtually complete separation of liquid and vapor; that is, throughout the confines of the device, liquid and vapor are in constant contact with each other.

U.S. Pat. No. 3,146,189 (Cl. 208-146), issued Aug. 25, 1964, involves a device for effecting the initial distribution of a vapor/liquid feed stream to a fixed-bed of catalyst particles. The liquid and vaporous components are separately introduced into the catalyst bed through a horizontal plate containing liquid downcomers and vapor downcomers, the latter extending into the bed of catalyst particles and designed to afford lateral vapor flow therethrough. Separation of the mixed-phase is effected in the void space between the inlet conduit and nozzle (30 and 31), and the horizontal plate (17). Liquid collects on the plate to a level which is determined by the height of a plurality of cylindrical weirs (18); overflowing liquid is trickled downwardly into the catalyst particles through an orifice (19) in the bottom of each weir. Vapors are prevented from entering the weirs by virtue of the created liquid seal. These are caused to flow through the upper periphery of downcomers (20), downwardly therethrough and finally laterally through screening means (27) laterally into the catalyst bed. The vapor downcomers are adapted with an imperforate top plate (25) to prevent liquid from entering therein.

Although the reference recognizes the disadvantages of vapor/liquid channelling, and provides a device for alleviating the same where the reactant stream initially contacts the catalyst bed, there is neither recognition of, nor provision made with respect to channelling which occurs throughout the remainder of the catalyst particles. In short, there is no re-mixing for the creation of froth and re-distribution of the same; further, the device is incapable of so doing.

U.S. Pat. No. 3,378,349 (Cl. 23-288), issued Apr. 16, 1968, directs itself to an inner-reactor mixed-phase distribution apparatus, the principal function of which serves to thoroughly admix the reactant stream effluent with a quench stream introduced between catalyst zones (Column 1, Lines 23-37 and Column 8, Lines 17-41). Whether gaseous, or liquid quench, the device is designed for the same to be introduced directly into the mixed-phase effluent emanating from the preceding, upper bed of catalyst particles.

In contrast to the mixed-phase distributor herein described, there exists no separation of the reactant stream effluent into the individual liquid and vaporous phases. This is evident, not only from the construction of the apparatus (particularly as shown in FIG. 1), but also in the description of the manner in which the device functions. As indicated, both liquid and vapor constituents flow through the same downcomers immediately following disengagement from the previous bed of catalyst particles. Furthermore, there exist no creation of an intimate froth, by way of venturi-shaped eductors, from previously separated vapor and liquid for re-distribution into the succeeding bed of catalyst particles.

Still another mixed-phase distributing device is the subject of U.S. Pat. No. 3,524,731 (Cl. 23-288), issued Aug. 18, 1970. The device is intended to ease the ill effects resulting from maldistribution (channelling) of the mixed-phase components (Column 1, Line 65 through Column 2, Line 15). Essentially, the distributing apparatus consists of a horizontal plate having inserted therein and therethrough a plurality of short tubes and a plurality of longer tubes which are notched proximate to the terminus above the horizontal plate. Functioning of the distribution device is generally described in Column 2, Lines 26–49 and in Column 4, Lines 22–46; a perusal thereof indicates that the device functions differently with high and low liquid flow rates. In the former situation, only liquid flows downwardly through the shorter tubes, while both liquid and vapor flow through the longer tubes.

Although there could be considered a separation of liquid and vapor components, only, however, in the situation of low liquid flow rates, there is no separation and re-mixing in such a manner as to create an intimate froth for re-distribution into the next succeeding bed of catalyst particles. The froth is not created merely by virtue of the fact that liquid components are flowing downwardly through tubes other than those through which the vaporous material is passed.

A flow distributor system somewhat similar to that illustrated in U.S. Pat. No. 3,146,189, hereinabove described, is the subject of U.S. Pat. No. 3,685,971 (Cl. 23-288), issued Aug. 22, 1972. The distributor is located proximate to the reactant stream inlet port and is contiguous with the inlet conduit. Its discharge end consists of a plurality of depending, spaced-apart concentric frusto-conical baffle members which produce an outward deflection of concentric, annular-form flow streams to an equivalent proportional area of the lower catalyst bed. As previously stated, there is recognition of channelling at the initial portion of the catalyst bed, and the device is intended to eliminate the same by providing uniform distribution of the mixed-phase feed stream. There is no separation, re-mixing and re-distribution of the vapor and liquid within some intermediate portion of the catalyst bed.

U.S. Pat. No. 3,697,416 (Cl. 208-146), issued Oct. 10, 1972, involves a technique for the introduction of quench streams into intermediate loci of fixed-bed catalytic reaction zones and the various devices suitable for assuring proper, uniform mixing thereof with the mixed-phase reactant stream.

U.S. Pat. No. 3,867,103 (Cl. 23-288E), issued Feb. 18, 1975, is specifically directed toward a device for use in a hydrocarbon alkylation reaction zone, particularly as catalyzed by HF acid. Essentially, the reaction zone, in which alkylation is effected in liquid phase, is divided by horizontal plates into four distinct zones, or sections: (1) a lower, hydrocarbon-containing chamber 17 defined by an upper imperforate plate 16; (2) an acid-containing chamber 9 situated between plate 16 and an upper perforated plate 26; (3) an emulsion-forming zone 8 between plate 26 and another upper perforated plate 7; and, (4) a soaking zone above plate 7. Hydrocarbons pass through standpipes 14, disposed above plate 16, but in communication with hydrocarbon zone 17; these are situated directly below a plurality of venturi tubes 11, disposed above and below perforated plate 26. Hydrocarbons flow out of the standpipes upwardly into the venturi tubes at a rate sufficient to effect eduction therewith of HF acid. The venturi tubes discharge into the emulsion-forming zone 8, and therefrom into the soaking zone above horizontal plate 7. It is noteworthy that the venturi tubes do not effect eduction; the acid is educted by the high velocity hydrocarbon and introduced therewith into the lower open end 12 of the venturi. Further, horizontal plate 26, through which the venturi tubes are disposed, is not otherwise imperforate. Also noted is the fact that the venturi tubes do not contain apertures (other than the end openings), and are not, therefore, adaptable to vapor/liquid separation.

Inner-reactor means for effecting the multiple-stage contact of a reactant stream, wherein a heat-exchange medium is introduced between individual beds of catalyst particles, is described in U.S. Pat. No. 3,498,755 (Cl. 23-288), issued Mar. 3, 1970. The described device permits the utilization of the intermediately-introduced heat-exchange stream to provide both a mixing and eduction effect with the reactant stream flow between beds of catalyst particles, with the alleged result of reducing the overall pressure drop across the entire reactor — i.e. inlet pressure minus outlet pressure. A fairly concise description concerning the operation of the device is found at Column 3, Lines 41–59, and it is noted that the "discharge nozzle means" may have the shape of a venturi tube.

Immediately ascertained, especially upon reference to the drawing, is the fact that eduction of the reactant stream into the venturi eductor by the downwardly-flowing heat-exchange medium does not take place. In the preferred embodiment, Column 3, Line 69 through Column 4, Line 19, the heat-exchange medium is steam while the reactant stream is ethylbenzene, both of which are vaporous at the indicated operating conditions. Two of the principal differences are readily apparent: (1) the illustrated device does not itself effect separation of any nature, much less liquid from vapor, followed by re-mixing; and, (2) no stream is educted into the venturi tube itself, proximate to the throat thereof, by the downwardly-flowing vapors such that a froth-type intimate dispersion of liquid in a continuous vapor phase results. With reference to the drawing, steam is introduced via conduits 13 into the venturi-shaped discharge nozzle 14, the velocity increasing as the venturi throat is traversed, and discharges into a mixing-distributing zone 16. Eduction from lower portion 8 of the reactant stream must take place through the annular-form passageway 11 formed by flared venturi portion 15 and the edge of partition 4. It is evident that no mixing of steam and reactant takes place within the venturi tube itself; in fact, the configuration of the illustrated device would appear to particularly preclude this.

Of the foregoing delineated references, copies of which accompany this application, all but two are directed toward mixed-phase catalytic processing and the uniform distribution of the vapor/liquid reactant stream; they are, therefore, appropriate to the subject matter of the present application. None, however, recognize the use of a venturi-shaped eductor for utilization in achieving the end result. With respect to the remaining two references, one involves the liquid-phase acid alkylation of hydrocarbons in which the reaction zone contains a transverse partition having a plurality of venturi-shaped tubes vertically-disposed therein, while the second utilizes a venturi-shaped nozzle in passing a vaporous reactant stream from one catalyst bed to another, while simultaneously introducing a vaporous heat-exchange medium between the two catalyst beds.

In summation, there exists no teachings and/or recognition of virtually complete separation of a mixed-phase reactant stream followed by a re-mixing thereof to create an intimate dispersion of liquid in a continuous vapor phase. Additionally, the device of the present invention effects the re-mixing of vaporous and liquid components within the confines of the venturi-shaped eductor by virtue of the eduction of liquid components into the venturi as a result of increasing vapor velocity.

SUMMARY OF INVENTION

Distribution of a mixed-phase vapor/liquid reactant stream to a fixed-bed of catalyst particles, in accordance with the invention herein described and claimed, is founded upon recognition of the fact that provisions have not heretofore been afforded which will alleviate vapor/liquid segregation with resultant channelling as the reactant stream introduced across the upper surface of the catalyst bed traverses the same. At best, the devices and techniques previously developed, and perhaps currently in use, do nothing more than distribute a multiplicity of small portions of the mixed-phase reactant stream onto a like number of small areas of catalyst particles situated atop the confined bed thereof. As a result, each small portion virtually immediately commences to segregate into distinct vapor and liquid streams which combine with other smaller vapor and liquid streams to seek channelled paths through the remainder of the catalyst particles. Similarly, the use of either vaporous, or liquid quench streams, or both, or attenuate the temperature rise experienced with exothermic reactions, has been recognized as a judicious operational technique. Many methods and devices have been proposed, virtually all of which inject a multiplicity of smaller quench portions intermediate the catalyst bed; however, the effect is the same as above noted. That is, these smaller portions seek to combine with each other to produce larger segregated portions which commence to channel through the bed. Through the practice of the present technique, and the use of the device encompassed by my invention, the mixed-phase vapor/liquid reactant stream is introduced into the fixed-bed of catalyst particles in a form which resists segregation, accompanied by channelling, as the reactant stream traverses the catalyst bed.

The mixed-phase reactant stream is generally introduced into an upper void volume within the reaction chamber, and passes through a perforated horizontal plate, or screen means under which is the upper surface of the bed of catalyst particles; a similar perforated plate, or screen-like member functions as catalyst support means at the lower extremity of the catalyst bed. Where a reaction chamber contains more than one bed of catalyst particles, each is usually defined by such upper and lower perforated horizontal plates, or screen means. The vapor/liquid distributor may be installed either in the uppermost void volume above the first bed of catalyst particles, or between the two perforated horizontal plates which separate one catalyst bed from another. In many situations, it will be advantageous to install the distributor device in both locations. Where the exothermicity of the reactions indicates an expected temperature rise beyond the maximum allowable for protection of the catalyst particles, a quench stream is introduced intermediate the catalyst beds. The present device readily facilitates the uniform, thorough distribution thereof, whether vaporous, or liquid, and also affords uniform quenching of the reactant stream, thereby avoiding localized hot spots.

Uniform distribution of the mixed-phase reactant stream and the creation of the froth-like intimate dispersion of liquid components in the continuous vapor phase, as herein described, involves distinct steps, each of which is effected in a separate, individual zone. The mixed-phase reactant stream, for discussion and illustration purposes is presumed to be the effluent from an upper, preceding bed of catalyst particles, which is intended for further processing in a succeeding catalyst bed. The mixed-phase effluent passes through the catalyst support plate into the substantially catalyst-free area in which the venturi-shaped eductors are vertically disposed in an otherwise substantially imperforate horizontal plate. Each venturi-shaped eductor is sealed at its upper terminus to prevent the direct introduction of liquid-phase components therethrough, and, at its lower terminus, is in open communication with the reaction chamber volume below the horizontal plate.

As utilized herein, and in the appended claims, the use of the term "sealed," with respect to the otherwise open upper terminus of the venturi tube, is intended to allude to this end being adapted in a manner which prohibits the entry of liquid-phase components. Sealing may, therefore, be effected by virtue of a unitarily constructed venturi tube, in which only the lower terminus is open. The upper terminus may be open and yet covered, or sealed with an imperforate cap having an inside diameter greater than the outside diameter of the eductor. Imperforate caps can either rest upon, or be otherwise attached to, the upper periphery of the open-ended eductor, or disposed a finite distance above the same. In any event, a preferred construction provides for the vertical cylindrical wall of the imperforate cap to terminate in a plane below the lower periphery of the upper vapor inlet apertures. A conical member may be disposed over the upper terminus of the eductor in a manner such that downwardly flowing liquid components are deflected away from the vapor-inlet apertures. Other methods by which the upper eductor terminus is sealed to prevent liquid components from entering the vapor inlets will become evident.

Each venturi-shaped eductor contains at least one vapor-inlet aperture in the upper section and at least one liquid-inlet aperture in the lower section. The latter is sealed by virtue of a liquid level maintained on the horizontal plate through which the eductors are vertically disposed. These apertures are generally circumferentially disposed, and may be substantially circular, horizontally rectangular, vertically rectangular, square, or combinations thereof. Liquid-inlet apertures are disposed proximate to the throat of the venturi, and the distance from the hoizontal plate to these apertures will determine the height of liquid maintained on the tray. Where the location of the liquid-inlet apertures, with respect to the venturi throat of the eductor, has been fixed by the design thereof, the level of liquid maintained on the horizontal tray is determined by the distance to which the eductor extends below the tray — i.e. maximum liquid level is attained when the horizontal tray is at the lower discharge end of the eductor.

Although the eductors may be vertically disposed through the horizontal plate, or tray, in a manner such that the venturi throat is below the tray surface, it is preferred that the throat be above the tray, or in the general plane containing the same. With respect to the distribution of the venturi-shaped eductors over the surface of the tray, many configurations are possible; they may be disposed such that the vertical axes form (1) a circumferential grid, (2) a square or rectangular grid or, (3) a triangular grid, etc. The discharge end of the eductor is adapted with a type of splash block to effect widespread distribution of the created froth to the surface of the succeeding bed of catalyst particles. Splash blocks are disposed a finite distance below the discharge end of the eductor, and may be in the form of a horizontal flat plate, spherical segment, regular pyramid, cone, etc.

In general practice, the venturi-shaped eductors will be structured such that the vapor velocity at the throat is in the range of about 60 to 450 feet/second at a liquid to vapor ratio of from about 5 to about 40, expressed as gallons per 1000 standard cubic feet. Precise design is optimized to achieve the maximum efficiency accompanied by the lowest tray operating pressure drop; this will generally range from about two to about eighty inches of water. Although not essential, it is preferred that the venturi-shaped eductors be uniform and virtually identical in design.

The vapor/liquid distribution apparatus encompassed by my inventive concept, and intended for utilization in fixed-bed catalytic reaction zones, will be further described and more fully understood upon reference to the accompanying drawings. Since these are presented for the sole purpose of illustration and to foster a complete understanding of the device and the techniques involved, they are not considered as having been drawn to an accurate scale. For any given application, the precise construction of the illustrated apparatus will be primarily dependent upon the reaction zone dimensions, the volume of catalyst disposed therein and the relative quantities of vapor and liquid which are introduced and traverse the entire catalyst bed.

BRIEF DESCRIPTION OF DRAWINGS

With brief reference now to the accompanying drawings,

FIG. 1 is a partially-sectioned, elevational view of a fixed-bed catalytic reaction chamber, generally indicated by numeral 1, and having a reactant stream inlet port and conduit 2, and a product effluent outlet port and conduit 3. When the effected reactions are principally exothermic in nature, thereby producing a temperature rise as the reactant stream traverses the catalyst bed, the reaction chamber will be adapted with vapor and/or liquid quench ports; conversely, with principally endothermic reactions, ports and conduits for the introduction of hot liquid and/or vapor will be provided. The use of such quench, or heat-supplying streams is well known to those having the requisite expertise in the petrochemical and petroleum refining arts; since they form no essential feature of my inventive concept, they are not illustrated herein. In the drawing presented, the present vapor/liquid distributing device is indicated as being placed between an upper catalyst bed 5 and a lower catalyst bed 14.

FIG. 2 is a partially-sectioned plan view taken substantially along the line 2—2 of FIG. 1, and illustrates a circumferential grid of the plurality of venturi-shaped eductors 9.

FIG. 5 is an enlarged, partially-sectioned elevation of eductor 9 showing one of many modifications thereof and the spacial relationship with imperforate horizontal plate 8.

FIGS. 6, 7, 8, 9, 10 and 11 are partially-sectioned views of part of the upper section of the eductors, and are presented to indicate various sealing means in combination with the vapor-inlet apertures.

FIG. 12 is a partially-sectioned enlarged plan view taken substantially along the line 12—12 of FIG. 5 (horizontal plate 8 has been omitted), and shows eductor 9 having four vapor-inlet apertures 11.

In FIG. 16, the splash block is a flat, horizontal plate 21; in FIG. 17, the splash block is a spherical segment 23; and, in FIG. 18, the splash block is shown as a regular pyramid or cone 25. Also illustrated are possible modifications of liquid-inlet apertures 10, 24 and 26, respectively.

DETAILED DESCRIPTION OF DRAWINGS

Figure 4:
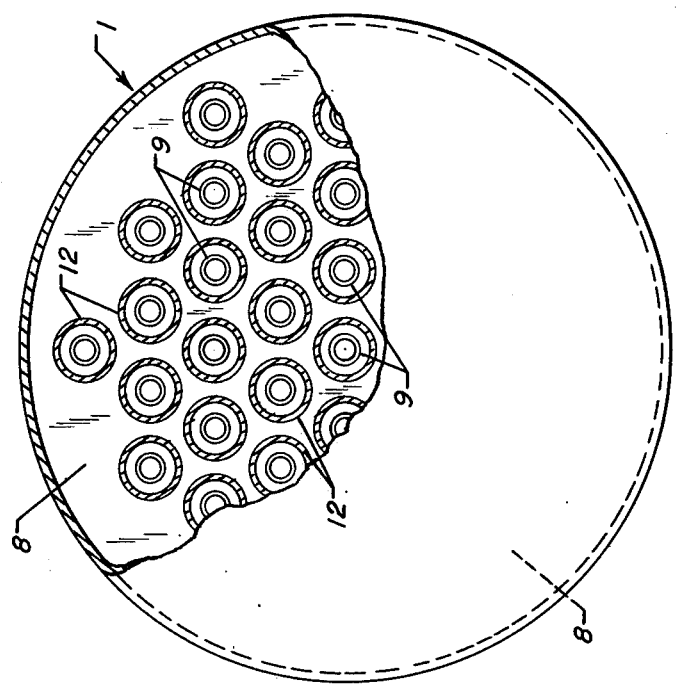
FIGS. 3 and 4 illustrate square and triangular grids, respectively.

With specific reference now to FIG. 1, catalytic reaction chamber 1 is shown as having two individual, separated catalyst beds 5 and 14; located intermediate these beds of catalyst particles, in a substantially catalyst-free volume, is the vapor-liquid distributor of the present invention; basically, the latter consists of a horizontal plate 8 having a plurality of vertically-disposed venturi-shaped eductors 9. These are in open communication, via the venturi discharge end, with the void volume below horizontal plate 8.

The mixed-phase reactant stream, following the necessary degree of pre-heat to achieve the design reaction zone temperature, is introduced into catalytic reaction chamber 1 by way of inlet port and conduit 2. Perforated horizontal baffle 4, defining the upper extremity of catalyst bed 5, serves, in this illustration, to initially distribute the reactant stream throughout the catalyst particles. The appropriate art is replete with examples of devices to effect the initial distribution of a reactant stream (existing in mixed-phase) to a catalytic reaction zone; one such device is the subject of U.S. Pat. No. 3,685,971 (Cl. 23-288R), hereinbefore discussed. The use of such a device is neither essential to, nor a part of the device encompassed by my inventive concept. However, the vapor/liquid distributor herein described may be installed in reaction chamber 1 in the area above horizontal plate 8 in order to effect initial distribution of the reactant stream thereto. The reactant stream traverses catalyst bed 5 and emanates therefrom through perforated, horizontal catalyst-support plate 6; apertures 7 are obviously sized to inhibit the passage of catalyst particles therethrough. It is understood that perforated horizontal plate 4 may be in the form of screening means, or a mesh blanket, etc.

Reaction product effluent, in mixed-phase from catalyst bed 5, passes through horizontal plate 6 into a substantially catalyst-free chamber volume therebelow. An adequate head of liquid components is formed on horizontal plate 8 to a level which effectively seals liquid-inlet apertures 10 in the lower section of venturi-shaped eductors 9. In this configuration, the venturi throats 16 are situated in the plane containing horizontal plate 8, and the liquid inlet apertures 10, in a circular configuration, are located proximate to venturi throats 16 and at the point where the cylindrical wall of the eductor 5 begins to converge. Liquid components are prevented from flowing into the upper end of eductor 9 by virtue of the fact that this end is sealed; as illustrated, the upper end may be open, but yet effectively sealed through the use of an imperforate cap 12 having an inside diameter greater than that of eductor 9. The vertical cylindrical wall of cap 12 extends below the vapor-inlet apertures 11, which are disposed in the upper section of eductors 9, to decrease further the quantity of liquid components being introduced therethrough. Vapor-inlet apertures 11 and liquid-inlet apertures 10 may be substantially circular (as illustrated), square, triangular, vertically rectangular, or horizontally rectangular, etc. Vaporous components flow into and through the annular-form space created between the outside surface of the eductor and the inside surface of the cap employed to seal the upper terminus from liquid components. These flow into inlet apertures 11, downwardly through eductor 9, through venturi throat 16 and into the void volume above perforated plate, or screen member 13 as a froth-like admixture with liquid components educted through inlet apertures 10. Since they exist as a froth, the vaporous and liquid components will not immediately commence to segregate into individual streams thus giving rise to channelling. With the exception of the openings needed to accommodate the venturi-shaped eductors, horizontal baffle 8 is substantially imperforate. Relatively few extremely small diameter apertures may be supplied proximate the outer periphery to serve as liquid weep holes. After traversing catalyst bed 14, the vapor and liquid components pass through perforated horizontal plate 15 and out of the reaction chamber via outlet conduit 3.

Figure 3:
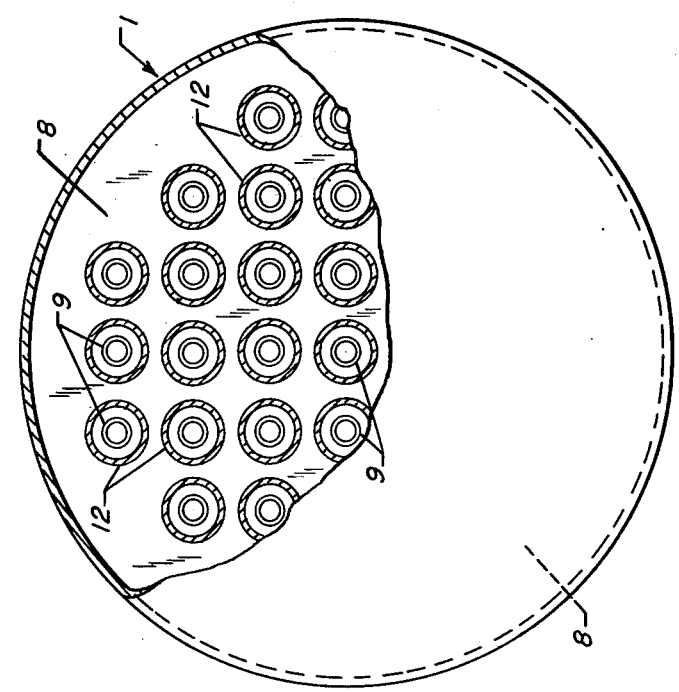

FIG. 2 is the partially-sectioned plan view taken substantially along the line 2—2 of FIG. 1. Illustrated is the horizontal plate 8 containing a circumferential grid of twenty-five eductors 9 and caps 12. Similarly, FIG. 3 shows thirty-seven eductors disposed as a square grid throughout horizontal plate 8, whereas FIG. 4 indicates a plate having forty-three eductors disposed as a triangular grid. In these three illustrations, the views have been presented as drawn to the same scale; thus, the number of eductors on a given distributing tray can be varied according to the shape of the grid which is formed thereby. Obviously, the actual number thereof will also be dependent upon processing parameters which have "fixed" the size (area) of the tray itself and the vapor/liquid concentration ratios in the reactant stream. One specific embodiment encompasses a distribution tray having a diameter approximating eleven and one-half feet contains 211 venturi-shaped eductors.

An enlarged, partially-sectioned elevational view of a venturi-shaped eductor is presented in FIG. 5; it is again cautioned that the same is not intended for interpretation as having been drawn to scale. Here the vapor-inlet apertures 11 are circular, number eight and are disposed circumferentially in two rows of four each. Liquid-inlet apertures 10 are indicated as being substantially circular and proximate to venturi-throat 16 which is in substantially the same plane as horizontal plate 8. FIG. 6 is a partial view of the upper section of venturi-shaped eductor 9, partially-sectioned to show vapor-inlet apertures 17 as smaller circular holes. FIGS. 7 and 8 are similar, and illustrate vapor-inlet apertures as vertically-disposed rectangular slots 18 and horizontally-disposed rectangular slots 19, respectively.

FIG. 9 is another partial view of the upper section of eductor 9, partially-sectioned to show vapor-inlet apertures as a combination of small circular holes 17 and vertically-disposed rectangular slots 18. FIG. 10 indicates that imperforate cap 12 may rest upon, or be otherwise integral with the upper terminus of eductor 9. FIG. 11 shows eductor 9 with an alternative seal-cap in the form of a conical member 20.

Figure 13:
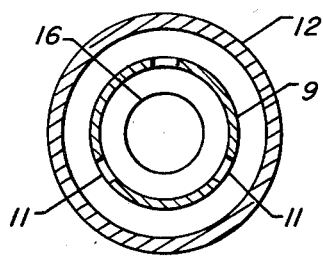
FIGS. 13, 14 and 15 are similar, and show eductor 9 as having three, six and eight apertures 11, respectively.
Figure 14:
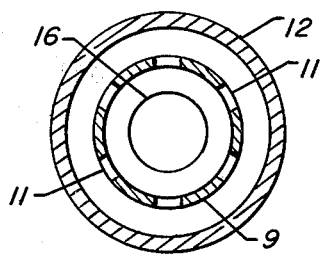
Figure 15:
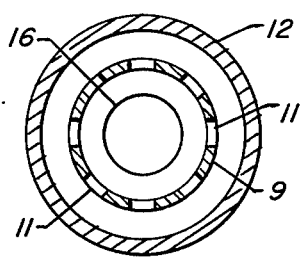

FIG. 12 is an enlarged, partially-sectioned plan view taken substantially along the line 12—12 of FIG. 5, and illustrates four vapor-inlet apertures 11 spaced 90° apart. FIG. 13 is similar, but shows three apertures 11 spaced 120° apart. In FIG. 14, the six apertures 11 are spaced 60° apart, while in FIG. 15, the eight vapor-inlet apertures are spaced 45° apart.

Figure 16:
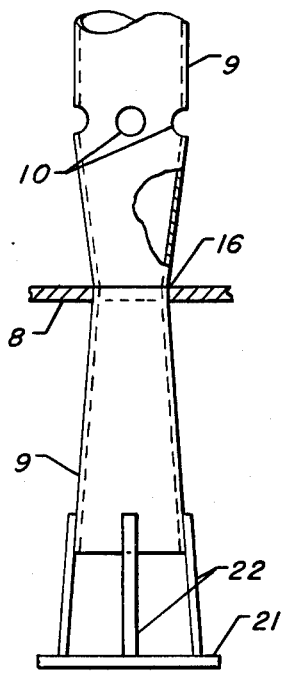
FIGS. 16, 17 and 18 are partially-sectioned elevational views of a part of the lower section of eductor 9.
Figure 17:
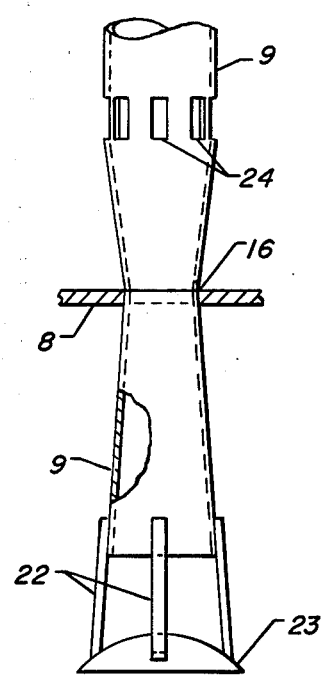
Figure 18:
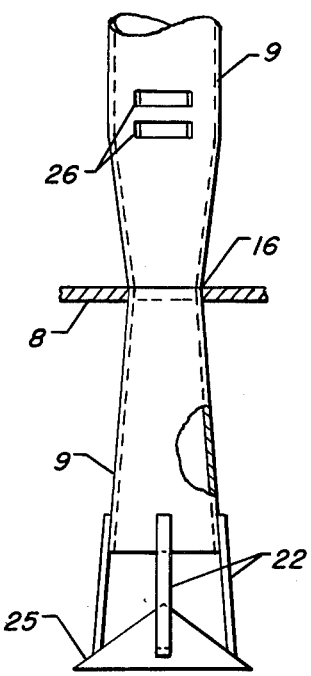

FIG. 16 illustrates venturi-shaped eductor 9 having substantially circular liquid-inlet apertures 10 and adapted at its lower terminus with a flat plate splash block 21 attached by way of support members 22. In FIG. 17, the liquid-inlet apertures are vertically-disposed rectangles 24, while the splash block takes the form of a spherical segment 23. FIG. 18 illustrates horizontally-disposed rectangular apertures 26 and a conical splash block 25. Other combinations of vapor-inlet apertures, liquid-inlet apertures and splash blocks will become evident. Common to these last-mentioned three Figures is the location of the liquid-inlet apertures at the point where the venturi begins to converge toward throat 16 and the latter is substantially in the same plane as horizontal plane 8.

Figure 19:
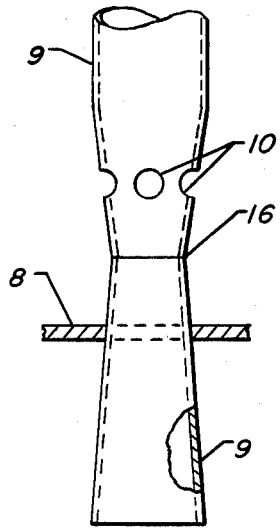
FIGS. 19, 20 and 21 illustrate various spacial relationships of venturi-throat 16 with imperforate horizontal plate 8, as well as modifications of the location of the liquid-inlet apertures.
Figure 20:
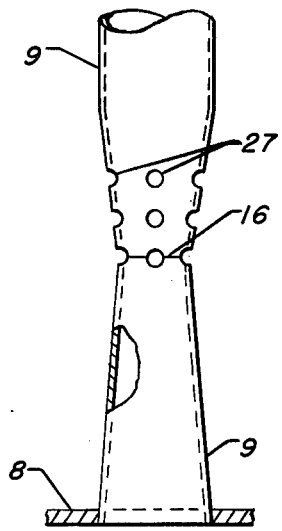
Figure 21:
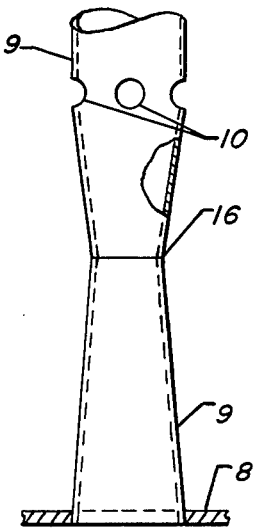

FIG. 19 is a partial view of the lower section of eductor 9 illustrating the disposition of liquid-inlet apertures 10 intermediate the point where the venturi commences to converge and venturi throat 16; also, the latter is located above horizontal plate 8 although a portion of the lower section extends therethrough. FIGS. 20 and 21 illustrate the lower section of eductor 9 terminating in the same plane as horizontal plate 8. In the former, liquid-inlet apertures 27 are at and above venturi throat 16, while in the latter, they are once again at the point where the eductor 9 converges toward throat 16.

It will be noted that the distribution device encompassed by my inventive concept permits the virtually complete separation of vaporous and liquid phases; this affords the re-mixing to create an intimate vapor/liquid froth. Other benefits and advantages will become apparent to those possessing the requisite skill in the appropriate art.

I claim as my invention:

1. In a cocurrent, mixed-phase catalytic reaction system wherein a vapor/liquid reactant stream flows downwardly into and through a bed of catalyst particles, the method for effecting uniform distribution of said reactant stream which comprises the sequential steps of:

(a) introducing said reactant stream into a substantially catalyst-free area (i) within said reaction system and, (ii) containing a plurality of vertically-disposed, venturi-shaped eductors, and separating vaporous components from liquid components in said area;

(b) passing separated vaporous reactant stream components (i) through an aperture in the upper portion of each eductor and, (ii) downwardly through the venturi throat thereof, the upper terminus of each eductor being sealed against the introduction of liquid components thereinto;

(c) educting liquid reactant stream components through a liquid-sealed aperture in the lower portion of each eductor proximate to the venturi throat thereof and forming a froth of vaporous and liquid components in the eductors; and, (d) discharging the resulting mixed vapor/liquid reactant stream as a froth from the lower end of each venturi-shaped eductor onto a bed of catalyst particles disposed below said catalyst-free area.

2. The method of claim 1 further characterized in that the mixed-phase reactant stream introduced into said catalyst-free area is the mixed-phase effluent from an upper, preceding fixed-bed of catalyst particles.

3. A vapor/liquid distributor for effecting uniform distribution of a mixed-phase reactant stream in the form of a froth to the upper surface of a fixed-bed of catalyst particles disposed within a catalytic reaction chamber, which distributor comprises, in cooperative relationship:

(a) a horizontal plate attached to the entire inner surface of said reaction chamber;

(b) a plurality of vertically-disposed, venturi-shaped eductors (i) extending above said horizontal plate and, (ii) in open communication therethrough with the reaction chamber volume therebelow;

(c) at least one vapor inlet aperture in the upper section of each of said eductors and means for sealing the upper terminus of each eductor against the introduction of liquid components thereinto; and, (d) at least one liquid inlet aperture in the lower section of each of said eductors disposed (i) above said horizontal plate and, (ii) proximate to the venturi-throat thereof.

4. The distributor of claim 3 further characterized in that the sealing means for the upper end of each eductor comprises an imperforate cap having an inside diameter greater than the outside diameter of said eductor.

5. The distributor of claim 3 further characterized in that the sealing means for the upper end of each eductor comprises an imperforate cone, the open lower end of which has an inside diameter greater than the outside diameter of said eductor.

6. The distributor of claim 3 further characterized in that each of said eductors contains at least two vapor inlet apertures in the upper portion thereof and at least two liquid inlet apertures proximate to the venturi throat thereof.

7. The distributor of claim 3 further characterized in that the venturi throat of each of said eductors is proximate to the plane containing said horizontal plate.

8. The distributor of claim 4 further characterized in that the vertical cylindrical wall of said cap terminates in a plane below the lower periphery of said vapor inlet aperture.

9. The distributor of claim 3 further characterized in that said venturi-shaped eductors are disposed throughout said horizontal plate such that the vertical axes thereof form a circumferential grid.

10. The distributor of claim 3 further characterized in that said venturi-shaped eductors are disposed throughout said horizontal plate such that the vertical axes thereof form a square grid.

11. The distributor of claim 3 further characterized in that said venturi-shaped eductors are disposed throughout said horizontal plate such that the vertical axes thereof form a triangular grid.

12. The distributor of claim 6 further characterized in that said apertures are substantially circular.

13. The distributor of claim 6 further characterized in that said apertures are horizontally rectangular.

14. The distributor of claim 6 further characterized in that said apertures are vertically rectangular.

* * * * *